Nov. 20, 1934.                O. WITTEL                1,981,444
SUPPORTING STRUCTURE FOR A ROLL PROJECTION SCREEN
Filed May 21, 1931
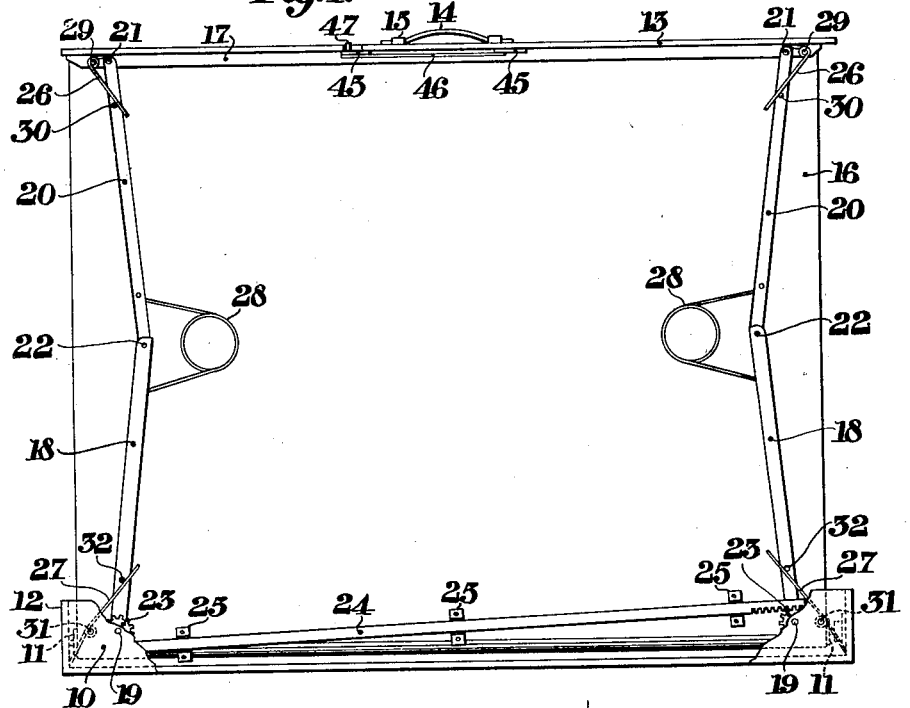
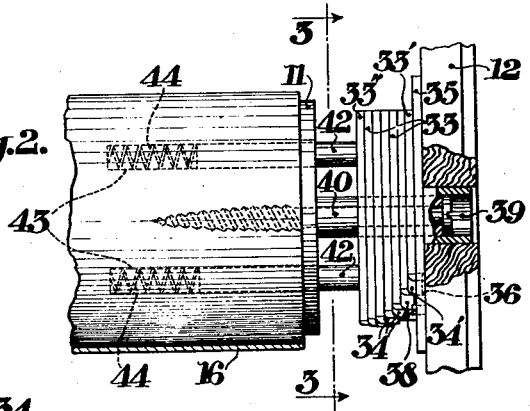
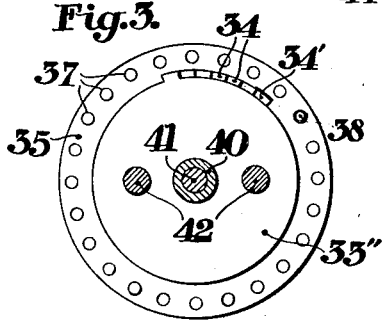
Inventor,
Otto Wittel, Patented Nov. 20, 1934

1,981,444

UNITED STATES PATENT OFFICE

1,981,444

SUPPORTING STRUCTURE FOR A ROLL PROJECTION SCREEN

Otto Wittel, Rochester, N. Y., assignor to Eastman Kodak Company, Rochester, N. Y., a corporation of New York Application May 21, 1931, Serial No. 539,002

19 Claims. (Cl. 88—24)

The present invention relates to the supporting structure for a projection screen, and more particularly to the foldable supporting structure and tensioning mechanism for a projection screen of the spring roller type.

Many objectionable features are encountered in the use of available projection screens of the spring roller type. For instance, the spring within the roller must be quite strong for proper operation thereof, but this gives rise to the necessity of holding or weighting the casing so that the screen may be drawn from the casing against the action of the spring and also results in a tendency for the screen to slam into closed position during lowering of the screen, with possible damage to the screen and screen surface. The screen may also be damaged during erection or lowering because of imperfect unwinding or winding resulting from unequal movement of the arms of the supporting structure.

For best results during projection the screen must be flat or held taut by some form of tensioning device. Heretofore tensioning devices for this purpose had to be individually operated after the erection of the screen and acted on the roller for the screen which was supported by a rigid or locked supporting structure so that portions of the screen, especially the edges, became stretched, thus making it impossible to thereafter make the screen flat, regardless of the tension created therein.

The principal object of the present invention is the provision of a projection screen of the spring roller type which may be readily and satisfactorily operated without injury to the screen or screen surface.

Another object of the invention is the provision of a supporting structure that insures equal movement of the side arms to contribute to smooth and even winding of the screen upon the roller.

A further object of the invention is the provision of a hinged supporting structure having coil torsion springs displaced from the hinged joints and acting against the spring in the roller, said springs being adapted to have decreasing erecting action as the screen approaches its erected positions, and conversely to have increasing action opposed to the spring in the roller as the screen approaches its closed position.

Still another object of the invention is the provision of a tensioning device which stops rotation of the spring roller after a predetermined rotation thereof and which may have its setting readily varied.

A still further object of the invention is the provision of a tensioning device which also forms a bearing for one end of the spring roller.

With these objects in view, the present invention consists in certain features of novelty in the construction, combination, and arrangement of parts by which the said objects and certain other objects are effected all as fully as described with reference to the accompanying drawing, and more particularly pointed out in the claims.

In said drawing like reference numerals designate similar elements throughout the several views wherein:

Figure 1 is a rear elevation of the projection screen according to the invention in erected position.

Figure 2 is a top view of the screen tensioning device showing the relation thereof to the casing and to the spring roller.

Figure 3 is an end elevation of the tensioning device viewed from a cutting plane through the line 3—3 of Figure 2.

In the illustrated embodiment of the invention, a casing 10 rotatably supports a spring roller 11 of known internal construction. Casing 10 has ends 12 and a cover 13, while the bottom of the casing 10 may be composed of a supporting structure as disclosed in my co-pending application, Serial No. 539,003 filed May 21, 1931. A handle 14 is attached in a known manner to the casing cover 13 by channel members 15 and is preferably made of leather.

A flexible screen 16 is attached to and arranged to be wound on to and off of spring roller 11. One surface of the screen 16 is provided with a surface having properly balanced diffusing and reflecting characteristics in any suitable manner such as by silvering, covering with aluminum paint or with glass beads. A cross bar 17 is fastened to the free end of screen 16 parallel to roller 11 and is also mounted on the under surface of the casing cover 13.

A pair of hinged side arms are pivotally connected between the casing 10 and the cross bar 17. These side arms comprise lower arms 18 of channeled cross section mounted by pivotal supports 19 on casing 10 and comprise upper arms 20 pivotally connected at one end by pins 21 to cross bar 17, and at the other end between the sides of channeled lower arm 18 by pin 22. Said side arms and cross bar 17 constitute a supporting structure for the screen 16 of known construction, but the novelty in the present invention resides in certain improvements for said supporting structure and in a tensioning device for the screen as hereinafter described.

The life and condition of the projection surface and of the screen 16 itself are substantially promoted by even unwinding and winding of the screen 16 with respect to the roller 11.

Such even unwinding and winding of the screen is obtained by causing cross bar 17 to remain parallel to casing 10 and to spring roller 11 mounted therein by virtue of an interconnecting means between the side arms of the supporting structure such as a bar operatively connected to the side arms. Said interconnecting means may comprise, more specifically, pinions 23 attached to lower arms 18 so as to rotate therewith around pivotal supports 19, and a rack 24 engaging said pinions and mounted to slide in a plurality of brackets 25 which are attached to the rear side of casing 10. The rack 24 is provided with teeth on opposite sides adjacent its ends, said teeth engaging said pinions 23 to cause equal and opposite movement thereof so that the side arms of the supporting structure move simultaneously and equally, and so that cross bar 17 is maintained at all times parallel to casing 10 and spring roller 11.

The tension of a spring in spring rollers is generally so great that the operator must hold the casing down while the screen is being erected or else the casing much be weighted. Also during lowering of the screen the casing must also be held and the cover lowered gently or else the tension of the spring roller will cause the casing to come up to the cover 13 or will cause the cover to slam down with jamming or creasing of the screen. In order to overcome these last mentioned difficulties, a plurality of springs are provided at the hinged joints of the supporting structure. These springs are mounted with respect to said hinged joints so that they oppose the action of the spring in the spring roller and so that they exert on the supporting structure a decreasing force during erection and an increasing force during lowering of the screen.

The plurality of springs aforementioned constitute a resilient means including three pairs of springs, namely, springs 26 at the upper corner joints, springs 27 at the lower corner joints, and springs 28 at the middle joints in the side arms of the supporting structure.

The springs 26 are coiled about studs 29 in the cross bar 17, have tails abutting cover 13 and have extensions slidably engaging headed pins 30 on upper arms 20. Springs 27 are coiled about studs 31 in the sides of casing 10, have tails abutting the ends 12 of casing 10 and have extensions slidably engaging headed pins 32 on lower arms 18. Springs 28 have one set of ends pivotally attached to upper arms 20 and the other set of ends pivotally attached to lower arms 18.

As the supporting structure is lowered from the position shown in Figure 1, the extensions, tails and ends of springs 26, 27, and 28 are moved toward each other to store more potential energy in said springs and to exert an increasing force opposed to the spring in spring roller 11. This potential energy is given up during erection of the screen to assist the action of the spring in the spring roller 11.

Springs 26, 27 and 28 are coil springs of the type which are adapted to be subjected to torsion as distinguished from coil springs which are adapted to be loaded axially and are hereafter characterized by the term "coil torsion springs".

However, as the supporting structure is lowered, the weight of the screen on the structure and the tension in the spring of spring roller 11 decrease so that the rate, at which the tension in coil torsion springs 26 and 27 increases, is reduced an amount corresponding to these decreasing forces, and conversely as the supporting structure is raised the rate, at which the stored energy in coil torsion springs 26 and 27 is given up, is increased to correspond to the increasing weight of the screen on the structure and the increasing tension in spring roller 11. The change in rate at which the energy in the coil torsion springs 26 and 27 is delivered is effected by providing a sliding engagement between the extensions of said springs 26 and 27 and the supporting structure so that the increasing resistances on the structure during erection act through decreasing lever arms and so that the decreasing resistances on the structure during lowering act through increasing lever arms.

Headed pins 30 and 32 are provided on upper arms 20 and lower arms 18, respectively, and make sliding engagement with the respective extensions of coil torsion springs 26 and 27. The studs 29 and 31 are located on opposite sides or outside of the side arms so that when said arms are folded up, pins 30 and 32 move farther away from said studs 29 and 31 and vice versa during erection pins 30 and 32 move nearer to said studs 29 and 31. In fact, the coil torsion springs 26, 27 and 28 may be so selected and studs 29, 31, and headed pins 30 and 32 so located that the forces within the supporting structure of the screen are so nicely and precisely balanced that the cover 13 will remain at any intermediate position during erection or lowering of the screen. Such an accurate balance cannot be obtained, however, without arranging the coil torsion springs 26 and 27 as described above.

The tensioning device for maintaining the screen taut while in erected position is broadly a stop means for spring roller 11 acting after a predetermined rotation thereof. Such tensioning device comprises primarily a plurality of disks 33 rotatably mounted on the sleeve 40 of spring roller 11, each disk having a projecting lug 34 adapted to engage the lug 34 on the adjacent disk 33. A circular plate 35 is provided with an aperture 36 adapted to receive lug 34' on disk 33'' adjacent plate 35 and is provided with a plurality of concentrically located holes 37 which are adapted to individually engage a pin 38 in the end 12 of casing 10. A sleeve 39 is attached concentrically to plate 35 and is supported by the end 12 of casing 10. The sleeve 40 of spring roller 11 is held firmly against the end of spring roller 11 by means of a long wood screw 41, said sleeve 40 rotating within the sleeve 39 attached to plate 35.

Disks 33 and plate 35, as well as sleeve 39, are axially slidable upon sleeve 40. Rods 42 are fastened to end disk 33'' and slide within holes 43 provided in the end of spring roller 11. Coil springs 44 are located behind rod 42 in holes 43 to hold disk 33 and plate 35 in sliding surface contact with each other and to normally hold plate 35 against the end 12 of casing 10 when pin 38 registers with one of the holes 37 in plate 35.

The operation of the tensioning device is as follows: As the screen 16 is erected the rods 42 turn disk 33'' until the lug 34 thereon engages the lug 34 on the adjacent disk 33 to cause rotation of both disks with the roller 11. Subsequent disks 33 are picked up by the rotating assembly in the same manner until the lug 34' on disk 33', which is normally in engagement with aperture 36 on plate 35, is engaged. Then the spring roller 11 can no longer be rotated and the tension device is acting as a stop means as shown in Figure 2. During lowering of the screen, disk 33 will again be rotated in the same direction as the spring roller and will be engaged by subsequent disks 33 until the screen is lowered, in which position the lugs 34 will abut the lugs 34 on adjacent disks 33 as shown in Figure 3. The selection of the number and circumference of disks 33 will depend upon the greatest height to which the screen is to be raised and may be determined mathematically or by trial.

The tensioning device or stop means preferably becomes operative just before the side arms of the supporting structure move into a straight line or a locking position. In this slightly bent position the side arms of the supporting structure function as toggle joints and the combined action of the springs in roller 11, coil torsion springs 26, 27 and 28, as well as the toggle action of the side arms maintains the screen 16 properly taut and substantially in a flat plane.

The moment at which the tensioning device becomes operative to stop the rotation of spring roller 11 may be varied by adjustment of disk 35. By depressing the outer end of sleeve 39, the disk 35 is moved out of engagement with pin 38 and disks 33 are moved axially along the sleeve 40 against the action of springs 44. In this position disk 35 may be manually rotated in the same direction as spring roller 11 rotates to allow screen 16 to be erected to a greater height, or may be manually rotated in a direction opposite to that of spring roller 11 to decrease the height to which the screen 16 can rise, and decrease the toggle action of the erecting structure side arms.

A locking means of any suitable construction may be provided to lock cover 13 to casing 10 in closed position of the screen. As a result the handle 14 serves a dual purpose. It may be used for carrying the screen or may be used for erecting the screen when said locking means is disengaged. Any conventional form of locking means will suffice, such as a means composed of levers 45 pivotally mounted on the lower surface of cover 13, interconnected by a bar 46 and moved by a knob 47 into a horizontal slot in the side of casing 10.

Since many modifications of the improvements to the supporting structure and of the tensioning device are possible without departing from the scope of the present invention, this disclosure is to be construed in an illustrative and not in a limiting sense.

Having now particularly described my invention, what I claim and desire to protect by Letters Patent of the United States is:

1. In a foldable projection screen, the combination with a casing, a supporting structure including a cross member and including side arms operatively connected between said cross member and said casing, a flexible screen and a spring roller for said screen, both mounted between said casing and said cross member for unrolling of the screen upon erection of said supporting structure, of a means for preventing total erection of said supporting structure and preventing movement of said side arms to straight line position, and resilient means acting on said supporting structure and creating a toggle action in said side arms, the combined effort of said resilient means and said toggle action being opposed to and greater than the effect of said spring roller.

2. In a foldable projection screen, the combination with a casing, a supporting structure including a cross member and including side arms operatively connected between said cross member and said casing, a flexible screen and a spring roller for said screen, both mounted between said casing and said cross member for unrolling of the screen upon erection of said supporting structure, of a stop means for engaging said spring roller and preventing movement of said side arms to straight line position upon erection of said supporting structure, and a plurality of springs acting on said supporting structure and creating a toggle action in said side arms, the combined effort of said springs and said toggle action being opposed to and greater than the effort of said spring roller.

3. In a foldable projection screen, the combination with a casing, a supporting structure including a cross member and including side arms operatively connected between said cross member and said casing, a flexible screen and a spring roller for said screen, said spring roller and said screen being mounted between said casing and said cross member for unrolling of the screen upon erection of said supporting structure, of a means for preventing movement of said side arms to straight line position upon erection of said supporting structure, and resilient means acting upon said supporting structure and variable during erection and closing of the supporting structure to maintain equilibrium between the mechanical forces acting thereon.

4. In a foldable projection screen, the combination with a casing, a supporting structure including a cross member and including side arms operatively connected between said cross member and said casing, a flexible screen and a spring roller for said screen, said spring roller and said screen being mounted between said casing and said cross member for unrolling of the screen upon erection of said supporting structure, of a means for preventing movement of said side arms to straight line position upon erection of said supporting structure, and resilient means slidably engaging said side arms to create a toggle action therein and variable during closing and erection of the supporting structure to maintain the mechanical forces acting thereon in equilibrium.

5. In a foldable projection screen, the combination with a casing, a supporting structure including a cross member and including side arms operatively connected between said cross member and said casing, a flexible screen and a spring roller for said screen, said spring roller and said screen being mounted between said casing and said cross member for unrolling of the screen upon erection of said supporting structure, of a means for preventing movement of said side arms to straight line position upon erection of said supporting structure, and resilient means acting upon said supporting structure to create a toggle action in said side arms and having relatively movable points of application to vary the effective effort of said resilient means and to maintain the mechanical forces acting upon said supporting structure in equilibrium.

6. In a projection screen, the combination with a screen supporting structure including hinged side arms pivotally mounted, of interconnecting means between said side arms including pinions attached to the lower end of said arms and including a rack engaging said pinions and permitting direct manual erection and closure of said supporting structure.

7. In a projection screen, the combination with a screen supporting structure including hinged side arms pivotally mounted, of interconnecting means between said side arms including pinions attached to the lower end of said side arms and including a rack having teeth on opposite edges to engage said pinions and permitting direct manual erection and closure of said supporting structure.

8. In a projection screen, the combination with a screen supporting structure including hinged side arms pivotally mounted and a cross bar pivotally connected between said side arms, of a spring roller for the screen and a plurality of coil torsion springs having the axes thereof displaced from the pivotal joints of said supporting structure and acting on said supporting structure in opposition to said spring roller.

9. In a projection screen, the combination with a screen supporting structure including hinged side arms pivotally mounted and a cross bar pivotally connected between said side arms, of a spring roller for the screen, studs on said cross bar displaced from the pivotal connections of said side arms, and coil torsion springs on said studs slidably engaging said side arms and acting in opposition to said spring roller.

10. In a projection screen, the combination with a screen supporting structure including hinged side arms and pivotal supports therefor, of a spring roller for the screen, studs adjacent said supports and outside or on opposite sides of said side arms and coil torsion springs on said studs slidably engaging said side arms and acting in opposition to said spring roller.

11. In a projection screen, the combination with a screen supporting structure including hinged side arms, a cross bar therebetween and pivotal supports for said side arms and said cross bar, of a spring roller for the screen, studs adjacent but displaced from said pivotal supports, headed pins on said side arms and coil torsion springs on said studs in sliding engagement with said headed pins, said studs being located so that said headed pins swing toward said studs during erection of the screen supporting structure.

12. In a projection screen, the combination with a casing and a spring roller for the screen rotatably mounted in said casing, of a tensioning device including a plurality of adjacent rotatable elements adapted to successively engage each other after predetermined rotation, connecting means between one end rotatable element and said spring roller to prevent relative motion therebetween, and means between the other end rotatable element and said casing preventing relative motion therebetween, whereby said spring roller is permitted only a previously determined number of rotations.

13. In a projection screen, the combination with a casing and a spring roller for the screen rotatably mounted in said casing, of a tensioning device including a plurality of adjacent rotatable elements adapted to successively engage each other after predetermined rotation, connecting means between one end rotatable element and said spring roller preventing relative rotary motion therebetween and adjustable means between the other end rotatable element and said casing preventing relative motion therebetween whereby the number of predetermined permitted rotations of said spring roller may be varied.

14. In a projection screen, the combination with a casing and a spring roller for the screen rotatably mounted in said casing, of a tensioning device including a sleeve mounted on one end of said spring roller, a plurality of disks rotatably mounted on said sleeve, and each having a lug adapted to engage the lug on an adjacent disk, a connection between one end disk and said spring roller to prevent relative motion therebetween and a circular plate engaging a pin on said casing, and adapted to receive the lug on the other end disk and prevent relative motion between said disk and the casing.

15. In a projection screen, the combination with a casing and a spring roller for the screen rotatably mounted in said casing, of a tensioning device including a sleeve mounted on one end of said spring roller, a plurality of disks rotatably mounted on said sleeve and each having a lug adapted to engage the lug on an adjacent disk, a connecting means including rods on one end disk axially slidable in holes in the end of said spring roller, adjusting means including a circular plate rotatably mounted on said sleeve provided with holes near the periphery thereof, and provided with an aperture to receive the lug on the other end disk, and including a pin on said casing adapted to engage the holes in said plate.

16. In a projection screen, the combination with a casing and a spring roller for the screen rotatably mounted in said casing, of a tensioning device including a sleeve mounted on one end of said spring roller, a plurality of disks rotatably mounted on said sleeve and each having a lug adapted to engage the lug on one adjacent disk, connecting means including rods on one end disk axially slidable in holes in the end of said spring roller, adjusting means including a circular plate rotatably mounted on said sleeve, provided with holes near the periphery thereof and provided with an aperture to receive the lug of the adjacent disk and including a pin on said casing adapted to engage the holes in said plate, and springs in the holes in said roller resiliently holding said disks in slidable surface engagement with each other and holding said plate in engagement with the pin on the casing.

17. In a projection screen, the combination with a casing and a spring roller for the screen rotatably mounted in said casing, of a tensioning device including a sleeve mounted on one end of said spring roller, a plurality of disks rotatably mounted on said sleeve and each having a lug adapted to engage the lug on an adjacent disk, a connection between one end disk and said spring roller to prevent relative motion therebetween, a circular plate engaging a pin on said casing and provided with an aperture to receive the lug on the other end disk, and a sleeve attached to said plate and mounted in said casing and forming a bearing for the first mentioned sleeve on the spring roller.

18. A projection screen comprising in combination with a box for said screen a spring controlled roller mounted within the sides of said box, a cover for said box, a projection screen attached to said roller and to said cover and spring means, located within the sides of said box and acting contrary to the spring of said spring controlled roller, for serving to control the opening and closing movement of the screen.

19. A projection screen comprising in combination with a box for said screen a spring controlled roller mounted within the sides of said box, a cover for said box, a projection screen attached to said roller and to said cover, means for stretching said screen, and spring means, located permanently within the sides of said box and acting contrary to the spring of said spring controlled roller, for serving to control the opening and closing movement of the screen.

OTTO WITTEL.